United States Patent
McCloud et al.

[11] 3,911,022
[45] Oct. 7, 1975

[54] ETHERIFICATION OF PHENOLIC COMPOUNDS

[75] Inventors: George T. McCloud; Marshall R. Brimer; Charles L. Gibson, all of Kingsport, Tenn.

[73] Assignee: Eastman Kodak Company, Rochester, N.Y.

[22] Filed: June 4, 1973

[21] Appl. No.: 367,038

[52] U.S. Cl. .......................... 260/612 D; 260/613 D
[51] Int. Cl.² .......................................... C07C 43/20
[58] Field of Search ......... 260/612 D, 613 D, 613 R

[56] References Cited
UNITED STATES PATENTS

| | | | |
|---|---|---|---|
| 2,331,265 | 10/1943 | Coleman et al. | 260/613 |
| 2,782,239 | 2/1957 | Mavity | 260/613 D |
| 3,107,265 | 10/1963 | Butts et al. | 260/613 D |

OTHER PUBLICATIONS
General Electric, Chem. Abstract, 64, 9843a, (1966).

*Primary Examiner*—James O. Thomas, Jr.
*Assistant Examiner*—Nicky Chan
*Attorney, Agent, or Firm*—J. Frederick Thomsen; Daniel B. Reece, III

[57] ABSTRACT

Process is disclosed for etherifying phenolic compounds by reacting such compounds with either a saturated, aliphatic alcohol having 1 to 4 carbon atoms, an ester of the general formula

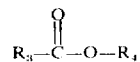

wherein $R_3$ and $R_4$ are each alkyl from $C_1$ to $C_4$, or mixtures of such alcohols and esters, in the presence of a tertiary amine, or a tertiary amine salt at elevated temperatures and pressures.

5 Claims, No Drawings

ETHERIFICATION OF PHENOLIC COMPOUNDS

This invention relates to a process for etherifying phenols.

It is known in the prior art that phenols may be etherified using alcohols and strong mineral acids as catalysts. High temperatures, however, are required and yields are generally low resulting from much tar formation. Also, hydroquinone ethers have been synthesized from dialkyl sulfates in the past. The present invention provides a process for forming ethers by reacting phenols and certain alcohols, certain esters, or mixtures thereof and using tertiary amines, or salts of tertiary amines as catalysts. For example, the reaction is illustrated below using hydroquinone as a starting material:

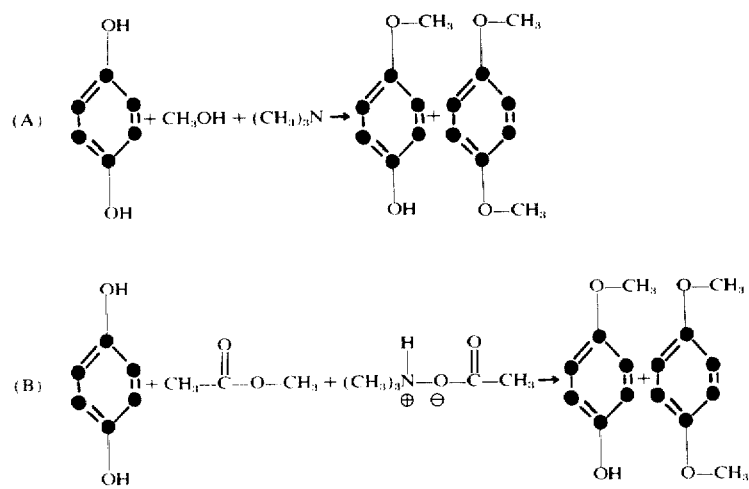

It is accordingly an object of this invention to provide a process for etherifying phenolic compounds using either alcohols or esters, or mixtures thereof as both the solvent and the alkylating agent.

It is a further object of this invention to provide a simple and efficient process for etherifying phenolic compounds.

It is another object of this invention to provide a process for etherifying phenolic compounds under relatively mild reaction conditions.

Other objects and advantages of the process according to the present invention will appear herein.

According to this invention, phenols are reacted with either saturated aliphatic alcohols, certain esters or mixtures of saturated aliphatic alcohols with certain esters in the presence of a tertiary amine or tertiary amine salt at an elevated temperature and pressure to etherify the phenol.

The phenolic starting material is intended to include aromatic compounds of the formulas

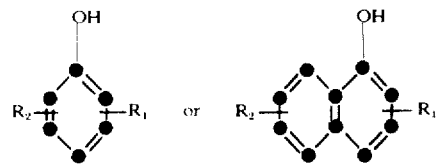

expecially monohydric and dihydric phenols wherein $R_1$ and $R_2$ are each hydroxyl, hydrogen, or alkyl from $C_1$ to $C_4$. Such compounds as phenol, hydroquinone, catechol, resorsinol, naphthohydroquinone, or these compounds having one or more alkyl substituents having 1 to 4 carbon atoms in any available position, are specifically included. Of particular interest are hydroquinone, phenol and naphthohydroquinone, and these compounds which have an alkyl group containing 1 to 4 carbon atoms in one available position on the aromatic ring. Such compounds are commercially available or readily synthesized by process well known in the art.

The phenol as described above is reacted with a saturated, aliphatic alcohol having 1 to 4 carbon atoms, an ester of the general formula

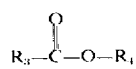

wherein $R_3$ and $R_4$ are each alkyl from $C_1$ to $C_4$, or mixtures of such alcohols and esters. Suitable alcohols include methyl, ethyl, propyl, isopropyl, butyl and isobutyl alcohol. Suitable esters include methyl, ethyl, propyl, isopropyl, butyl, and isobutyl acetate; methyl, ethyl, propyl, isopropyl, butyl, and isobutyl propionate; and methyl, ethyl, propyl, isopropyl, butyl and isobutyl butyrate. Such alcohols and esters are commercially available or readily synthesized by well-known techniques.

The reactants, i.e., the phenol and the alcohol or ester as described above are reacted in the presence of a tertiary amine or tertiary amine salt. Suitable tertiary amines are those of the formula

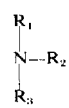

wherein $R_1$, $R_2$, and $R_3$ are each aliphatic alkyl groups having 1 to 4 carbon atoms. Tertiary amines such as trimethylamine, triethylamine, tripropylamine and tributylamine are commercially available. Salts of these amines may also be used. Especially desirable salts include salts of acetic acid, hydrochloric acid and sulfuric acid.

The etherifying reaction to this invention is preferably carried out batchwise by charging a reactor with 1 part by weight of a phenolic compound, from 1 to 3 parts by weight of an alcohol or ester as described herein (or mixture thereof) and from 0.1 to 1 part by weight of a tertiary amine or a tertiary amine salt. The charge is heated to a temperature of between about 200°C. and 250°C. (preferably between about 210°C. and about 230°C.) and a pressure of between 500 and 1500 psi. A blanket of a nonreactive gas such as nitrogen may be used. The mixture is stirred until the reaction is completed, normally taking from about 5 to about 15 hours. After allowing the reactor to cool, the solvent and catalyst are removed from the etherified product. It will, of course, be apparent to those skilled in the art that the reaction may also be carried out on a continuous basis in an appropriate reactor by proper choice of feed and take off to give dwell times generally equivalent to the reaction times specified herein.

Where it is desired to use a salt of a tertiary amine rather than the tertiary amine itself, acid from which the salt is derived is simply added to the reaction charge. For example, from about 10% to about 70% by weight, based on the weight of the tertiary amine, (preferably from about 20 to about 50% by weight) of the desired acid may be added to thereby form the salt of the tertiary amine.

Greater amounts of the alcohol, ester, or mixture thereof, as well as greater amounts of the tertiary amine or tertiary amine salt, may be used if desired. However, no beneficial results appear to be derived from use of such greater amounts.

The following examples are submitted for a better understanding of the invention.

EXAMPLE 1

A charge consisting of 2.6 pounds of methylacetate, 4.4 pounds of methanol, 3.1 pounds of hydroquinone, and 0.5 pounds of trimethylamine is added to an autoclave and heated to 210°C. and maintained for 12 hours. The autoclave is cooled to room temperature and the mixture is analyzed after the solvents and catalyst are removed. The analyses are as follows:

| | |
|---|---|
| Hydroquinone monomethyl ether | 58.7% |
| Hydroquinone dimethyl ether | 34.0% |
| Hydroquinone | 7.3% |

EXAMPLE 2

A charge consisting of 110 grams monotertiarybutyl hydroquinone, 200 grams of methanol, 100 grams of methylacetate, and 50 grams of triethylamine are added to an autoclave and heated to 217°C. and maintained 10 hours. The autoclave is cooled to room temperature and the mixture is analyzed after the solvents and catalyst are removed. The analyses are as follows:

| | |
|---|---|
| Monotertiarybutyl hydroquinone monomethyl ether | 60% |
| Monotertiarybutyl hydroquinone dimethyl ether | 12% |
| Monotertiarybutyl hydroquinone | 28% |

EXAMPLE 3

A charge consisting of 110 grams of hydroquinone, 200 grams of ethanol, 50 grams of triethylamine, and 15 grams of acetic acid are added to an autoclave and heated to 210°C. and maintained for 6 hours. The autoclave is cooled to room temperature and the mixture is analyzed after the solvents and catalyst are removed. The analyses are as follows:

| | |
|---|---|
| Hydroquinone monoethyl ether | 40% |
| Hydroquinone diethyl ether | 35% |
| Hydroquinone | 25% |

EXAMPLE 4

A charge consisting of 110 grams of hydroquinone, 200 grams of methanol, 50 grams of tributylamine, 4 grams hydrogen chloride are added to an autoclave and heated to 210°C. and maintained for 6 hours. A sample is collected and the analyses are as follows:

| | |
|---|---|
| Hydroquinone monomethyl ether | 45% |
| Hydroquinone dimethyl ether | 52% |
| Hydroquinone | 3% |

EXAMPLE 5

A charge consisting of 110 grams of hydroquinone, 200 grams methanol, 50 grams of tributylamine, and 5 grams of acetic acid are added to an autoclave and heated to 210°C. and maintained for 6 hours. A sample is collected and the analyses are as follows:

| | |
|---|---|
| Hydroquinone monomethyl ether | 67% |
| Hydroquinone dimethyl ether | 23% |
| Hydroquinone | 10% |

EXAMPLE 6

A charge consisting of 110 grams of hydroquinone, 200 grams of methanol, and 50 grams of tributylamine are added to an autoclave and heated to 210°C. and maintained for 6 hours. A sample is collected and the analyses are as follows:

| | |
|---|---|
| Hydroquinone monomethyl ether | 52% |
| Hydroquinone dimethyl ether | 21% |
| Hydroquinone | 27% |

EXAMPLE 7

A charge consisting of 110 grams of hydroquinone, 200 grams of methanol, 20 grams of trimethylamine, and 5 grams of sulfuric acid are added to an autoclave and heated to 210°C. and maintained for 6 hours. A sample is collected and the analyses are as follows:

| | |
|---|---|
| Hydroquinone monomethyl ether | 71% |
| Hydroquinone dimethyl ether | 29% |

Unless otherwise specified, all parts, percentages, ratios, etc. are on a weight basis.

Although the invention has been described in considerable detail with particular reference to certain preferred embodiments thereof, variations and modifications can be effected within the spirit and scope of the invention.

We claim:

1. Process of preparing a phenolic ether comprising reacting a phenolic compound of the general formula

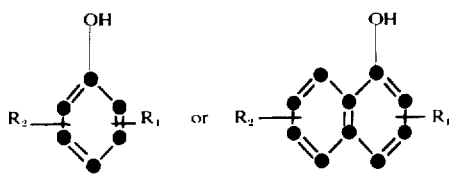

wherein $R_1$ and $R_2$ are each hydroxyl, hydrogen, or alkyl from $C_1$ to $C_4$, with from 1 to 3 parts by weight per part phenolic compound of a compound selected from the group consisting of alkanols having 1 to 4 carbon atoms, esters of the general formula

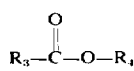

wherein $R_3$ and $R_4$ are each alkyl from $C_1$ to $C_4$, and mixtures of said alcohols and esters, in the presence of a catalytic quantity of a catalyst of the general formula

wherein $R_5$, $R_6$ and $R_7$ are each alkyl from $C_1$ to $C_6$, or a halide, sulfate or carboxylic acid salt of said catalyst wherein said carboxylic acid has from 1 to 4 carbon atoms, at a temperature of from about 200°C. to about 250°C. under a pressure of between 500 and 1500 psi.

2. Process according to claim 1 wherein said phenolic compound is selected from the group consisting of phenol, hydroquinone, naphthohydroquinone and monotertiarybutyl hydroquinone.

3. Process according to claim 1 wherein the ratio of said alcohol or said ester to said phenolic compound in the reaction is between about 1.5:1 and about 4:1 by weight.

4. Process of preparing a phenolic ether comprising the steps of a. charging a reactor with 1 part by weight of a phenolic compound of the general formula

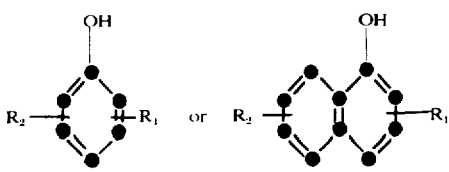

wherein $R_1$ and $R_2$ are each hydroxyl, hydrogen, or alkyl from $C_1$ to $C_4$, from about 1.5 to about 3 parts by weight of a compound selected from the group consisting of alkanols having 1 to 4 carbon atoms, esters of the general formula

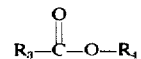

wherein $R_3$ and $R_4$ are each alkyl from $C_1$ to $C_4$, and mixtures of said alcohols and esters, and from about 0.1 to about 1 part by weight of a catalytic quantity of a catalyst of the general formula

wherein $R_5$, $R_6$ and $R_7$ are each alkyl from $C_1$ to $C_6$, or a halide, sulfate or carboxylic acid salt of said catalyst, wherein said carboxylic acid has from 1 to 4 carbon atoms, b. heating said charge to a temperature of between about 200°C. and about 250°C. at a pressure of between about 500 psi and about 1500 psi, c. agitating said charge for a period of between about 5 and about 15 hours, d. cooling the contents of said reactor, and e. recovering etherified phenolic compound from said reactor.

5. Process of preparing a phenolic ether comprising reacting a phenolic compound of the general formula

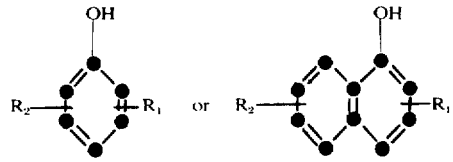

wherein $R_1$ and $R_2$ are each hydroxyl, hydrogen, or alkyl from $C_1$ to $C_4$, with from 1 to 3 parts by weight per part phenolic compound of a compound selected from the group consisting of alkanols having 1 to 4 carbon atoms, and mixtures of said alcohols with esters of the general formula

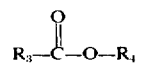

wherein $R_3$ and $R_4$ are each alkyl from $C_1$ to $C_4$, in the presence of a catalytic quantity of a catalyst of the general formula

wherein $R_5$, $R_6$ and $R_7$ are each alkyl from $C_1$ to $C_6$, or a halide, sulfate or carboxylic acid salt of said catalyst wherein said carboxylic acid has from 1 to 4 carbon atoms, at a temperature of from about 200°C. to about 250°C. under a pressure of between 500 and 1500 psi.

* * * * *